United States Patent [19]

Dittmar et al.

[11] Patent Number: 5,802,263
[45] Date of Patent: Sep. 1, 1998

[54] METHOD OF MESSAGE TRANSMISSION ACCORDING TO THE PRODUCER /CONSUMER PRINCIPLE BETWEEN USERS IN A DISTRIBUTED SYSTEM WITH TOKEN PASSING AND WITH TIME MONITORING FOR FAULT DETECTION

[75] Inventors: Ewald Dittmar, Ludwigshafen; Hans Dieter Kochs, Duisburg; Werner Dieterle, Mülheim, all of Germany

[73] Assignee: ABB Patent GmbH, Mannheim, Germany

[21] Appl. No.: 526,630

[22] Filed: Sep. 11, 1995

[51] Int. Cl.$^6$ .................................. H04L 12/42
[52] U.S. Cl. .................................. 395/182.02
[58] Field of Search ............... 395/182.02, 183.19, 395/185.01, 185.04, 185.09; 371/20.1, 20.2, 20.3, 20.4, 20.5, 20.6; 370/216, 222

[56] References Cited

U.S. PATENT DOCUMENTS

| | | | |
|---|---|---|---|
| 4,700,340 | 10/1987 | Beranek et al. | 370/16 |
| 5,036,518 | 7/1991 | Tseung | 371/32 |
| 5,109,384 | 4/1992 | Tseung | 371/32 |
| 5,289,460 | 2/1994 | Drake, Jr. et al. | 370/17 |
| 5,327,552 | 7/1994 | Liew | 395/575 |
| 5,408,646 | 4/1995 | Olnowich et al. | 395/575 |
| 5,473,599 | 12/1995 | Li et al. | 370/16 |
| 5,526,344 | 6/1996 | Diaz et al. | 370/16 |
| 5,586,251 | 12/1996 | Coleman et al. | 395/183.19 |

OTHER PUBLICATIONS

IEEE Publ. vol.40, No.4, Apr. 1992, pp. 738–744, Parallel-ring; A Token Ring LAN with Concurrent . . .

*Primary Examiner*—Robert W. Beausoliel, Jr.
*Assistant Examiner*—Stephen Elmore
*Attorney, Agent, or Firm*—Herbert L. Lerner; Laurence A. Greenberg

[57] ABSTRACT

A method of message transmission between users in a distributed system with token passing includes a special token procedure in order to achieve consistent message transmission, even in the case of a fault. The special token procedure is based on a coincidence of monitoring and information states of the users. In the case of an error, a logical resumption, which is derived from a consecutive sequence number, is carried out without adversely affecting data consistency. The method can be implemented in different versions, that is with information passing of user data in the form of a ring or the transmission of user data in physical multicast and the passing of associated check information in the form of a ring. The method can be used in supervisory control installations.

17 Claims, 12 Drawing Sheets

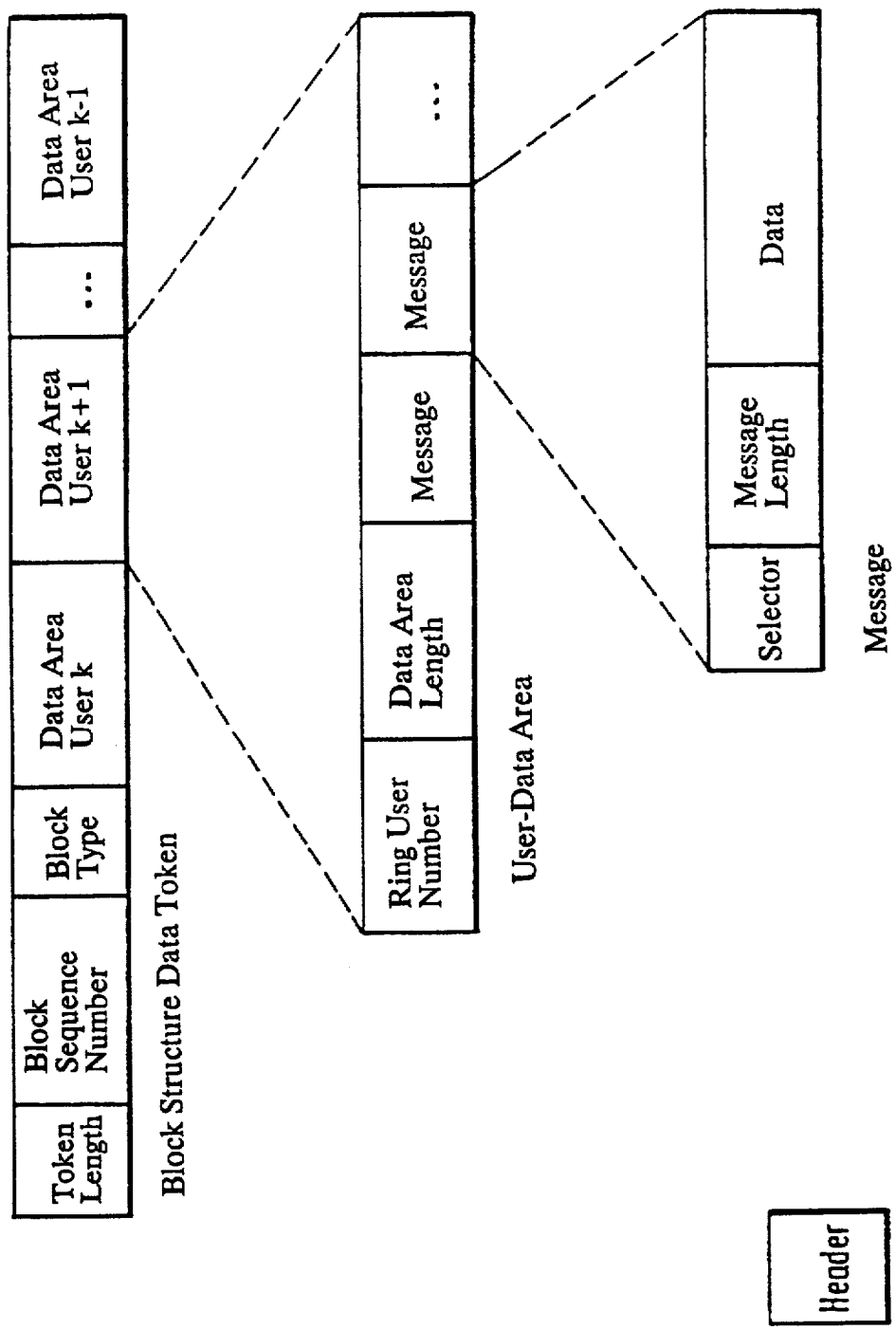

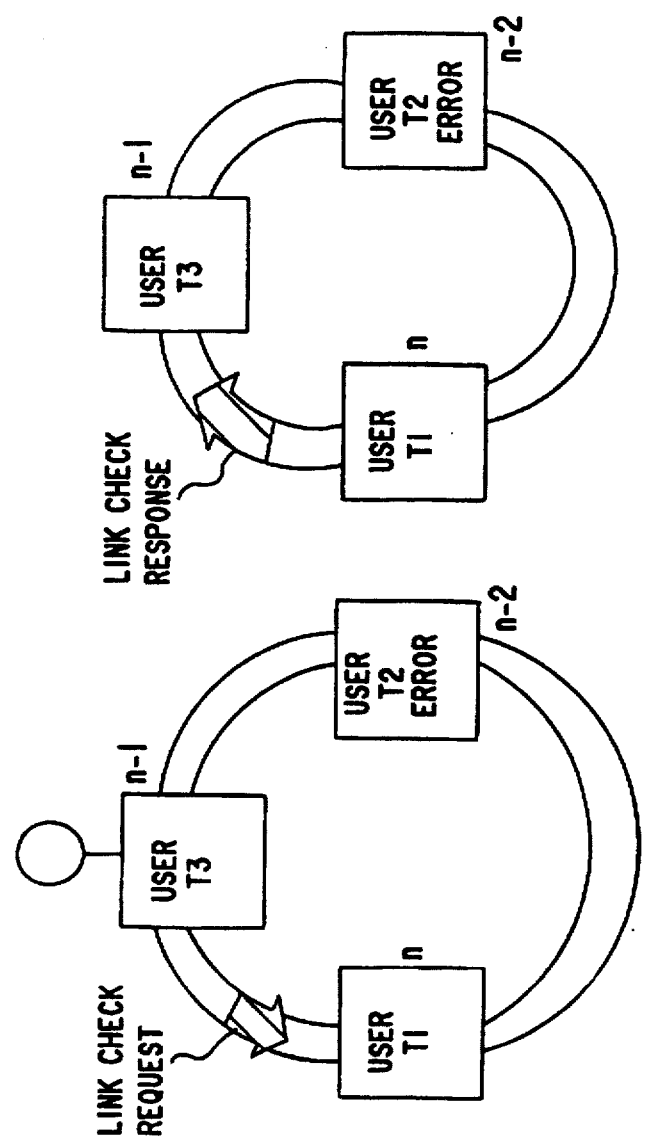

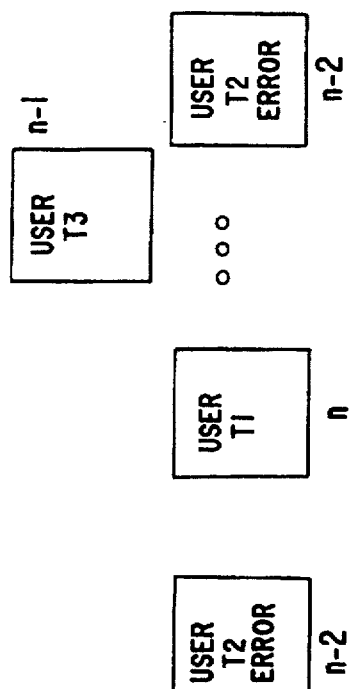
Fig.8I
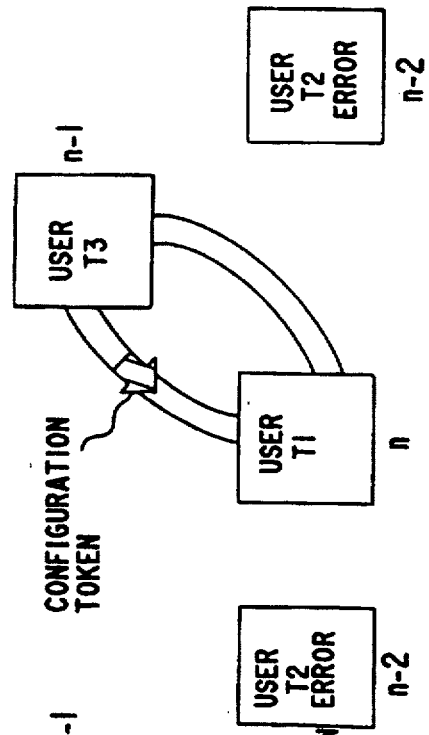
Fig.8H
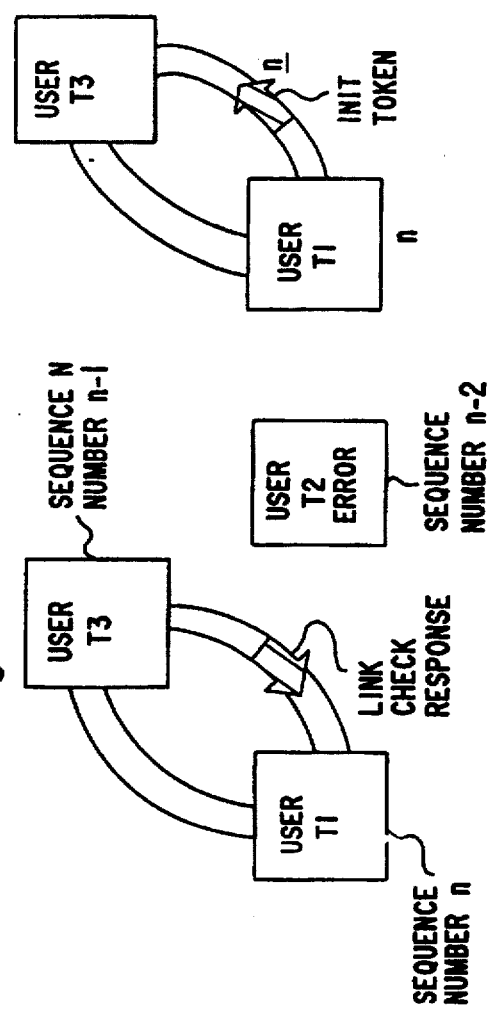
Fig.8G
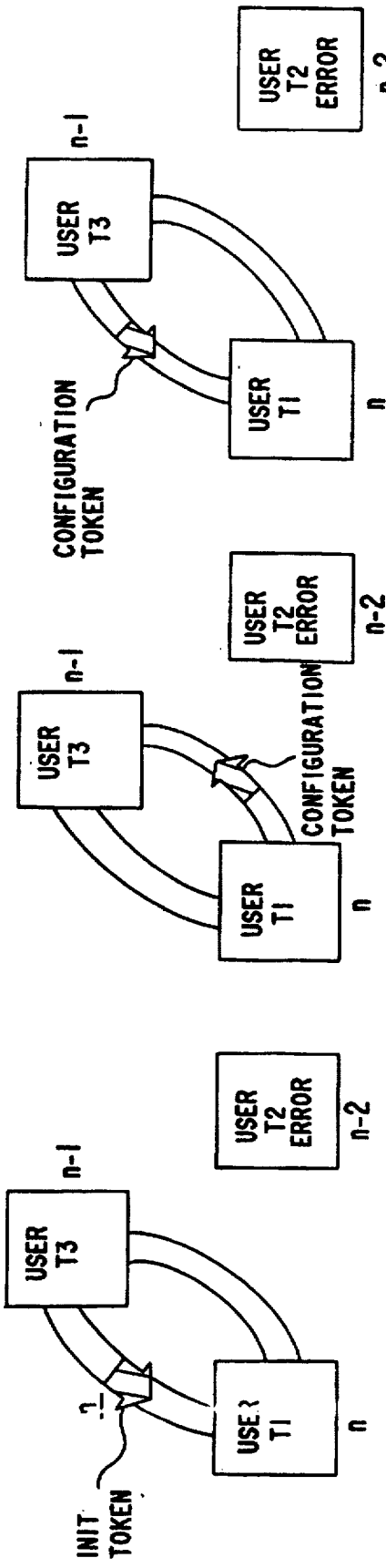
Fig.8L
Fig.8K
Fig.8J

METHOD OF MESSAGE TRANSMISSION ACCORDING TO THE PRODUCER /CONSUMER PRINCIPLE BETWEEN USERS IN A DISTRIBUTED SYSTEM WITH TOKEN PASSING AND WITH TIME MONITORING FOR FAULT DETECTION

BACKGROUND OF THE INVENTION

Field of the Invention

The invention relates to a method of message transmission according to the producer/consumer principle between users or subscribers in a distributed system with token passing and with time monitoring for fault detection.

Such a method, operating on the token passing principle, is known, for example, from a publication by H.-G. G öhring and F.-J. Kauffels, entitled: "Token-Ring: Grundlagen, Strategien, Perspektiven" [Token Ring: Principles, Strategies, Perspectives], published by DATACOM-Verlag Lipinski, 1990, in particular chapter 2.4.

There exists a series of ring-based protocols which operate on the so-called token passing principle and are known as token protocols. They have been standardized for various LAN bus systems (IEEE802.4/Token-Bus, IEEE802.5/ Token-Ring, ANSI X3T9.5/FDDI). The methods are based on a token, that is a special bit pattern which is used for bus access control. The token circulates in a logical or physical ring which is set up between the individual users.

However, those protocols do not ensure data consistency in distributed systems with decentralized database organization in the event of errors or failures of system components. In other words, if those methods are used, it is not ensured that all users will have the same state of information with respect to transmitted messages after failures or after reconfigurations as a result of failures. However, data consistency is the dominant requirement for all of the systems being considered herein (see the statements made in the text which follows). Furthermore, the protocols prove to be very inefficient when transmitting messages of short length (for the token ring: each message has to cover a complete token circuit before the next station may transmit; for the token bus: transmission and confirmation are separate for each message and each receiver). In the systems being considered herein, the same message is generally transmitted to a number of receivers (multicast transmission). Existing token protocols only permit unconfirmed multicast transmission. Confirmed transmission is possible only in unicast (transmission to only one receiver) and requires a separate confirmation phase. Apart from those fundamental problems, there are further, protocol-specific disadvantages, for example inversions in the sequence of transmitted messages or the lack of support of bus redundancy.

Those known ring-based methods cannot meet all of the essential requirements which arise in the case of an application in industrial supervisory control systems.

A method of error-protected information transmission which is known from German Patent DE 40 10 266 C2, for example in the configuration of the Ethernet Network/ Broadcast Token Bus (EN/BTB), likewise does not fully meet the requirements. The transmission is performed error-protected, but not consistently. Thus, in the case of that method, inversions in the sequence and duplicates of messages are possible in the event of failures/reconfigurations. All of the information is transmitted in broadcast, but with the use of modern computer technology that results in a relatively high load on the computer. EN/BTB requires programmable (intelligent) communication controllers. However, modern computers are exclusively equipped with non-intelligent controllers. EN/BTB does not support the use of standardized protocols.

The typical structure of a supervisory control system, and the requirements for such a supervisory control system or for a transmission method used therein are explained below with reference to FIG. 1.

The structure of a supervisory control system includes a plurality of computer components, such as auxiliary computers for process coupling, master computers for handling basic supervisory functions, which are known as SCADA functions, operator console computers for process visualization and additional computers for handling optional secondary functions. The computers are coupled through a local network, typically an Ethernet. In order to increase the availability of the overall system, computers performing an important function as well as the LAN bus are have a redundant configuration. The computers operate on a continuously updated process map, which is managed locally in each case (decentralized database organization). Transaction data are sent as messages. Due to the distribution and redundancy of functions and databases, there are complex data flows in the distributed system.

The essential requirements for such supervisory control systems are high availability, short, guaranteed response times and consistency of the distributed databases.

Data consistency is a prerequisite for the proper operation of the supervisory control systems. It is trivial in the case of no errors, but in the event of failures/reconfigurations in the system, it requires specific measures for the smooth continuation of message exchange. That results in very high requirements for the communication in distributed supervisory control systems. They include:

Message exchange without loss, falsification, duplication or mixing up of information (guidance consistency). Mixing up in such a case relates to messages of one sender, the so-called FIFO sequence.

Messages to a number of receivers must be transmitted to all of the receivers or to none of them (atomicity principle).

Transmission of messages in respectively identical sequence to all of the receivers (total sequence of messages).

Avoidance of superseding effects of original information and derived information (causal sequence of messages).

Fast, deterministic transmission of messages.

Fast failure detection of computers and LAN bus by constant mutual monitoring.

In the event of failure of computers, automatic exclusion of the same from the message traffic.

In the event of failure of the LAN bus, automatic switching over to a redundant LAN.

Low LAN and computer loading by system communication.

Data exchange between computers with different hardware and software.

Data consistency includes the four first-mentioned requirements for message transmission. Problems with respect to guidance consistency arise due to transmission errors or failures of a bus or receiver. The atomicity principle is adversely affected by the failure of the information source itself. A mixing up of messages (total and causal sequence) occurs in the case of indeterministic runtime performance in the system, for example in cases of reconfigurations or message repetitions as a result of failures or transmission disturbances.

In distributed computer systems, in particular if the UNIX operating system is used, the client/server concept is used for data exchange. That concept is tailor-made for centralized database organization and for systems without specific real time requirements, but it does not meet the above requirements. What is required is communication on the producer/consumer principle. The standardized TCP/IP, UDP-IP and ISO/OSI protocols are constructed for the client/server concept, but their characteristics are not appropriate for the object described herein. Nevertheless, their use is necessary for reasons of cost and for communication between computers of different types.

The conventional use of those protocols, with implementation of communication links between distributed processes corresponding to a structure which is predetermined by the application (logical point-to-point connections), has serious disadvantages. That applies in particular to the predominant, connection-oriented TCP/IP protocol or in a similar way to ISO/OSI protocols as well. The following reasons can be cited:

Individual transmission of messages when customary non-intelligent communication controllers are used, makes transmission complex (context change and protocol handling in the host). In order to reduce the computer and LAN load, a collective transmission of messages with combined time/volume control is necessary.

Information selection, i.e. the selection of the messages to be transmitted to the receivers, takes place on the transmission side in the case of standardized protocols. The transmitter keeps an update list for each receiver, which results in additional computer loading.

Standardized protocols allow confirmed transmission only in a directed mode. In the case of the systems being considered herein, that results in a multiplier effect for packing and transmitting messages: in relatively large supervisory control systems, each message is multiply packed and transmitted through the bus. In the case of transmitters of a redundant configuration, in addition to the transmission to the receivers, each connection is to be synchronized separately with the back-up computer.

An automatic monitoring of communication connections does not constitute part of the TCP specification and is consequently not provided in every protocol version. The configuring of the monitoring cycle (default setting: 2h) is likewise not possible for every protocol version.

With mutual monitoring of the computers through the use of connection interrupt in the event of error (time out), adaptation of the timers to the actual time requirements is not possible for all protocol versions. TCP/IP prescribes a minimum time duration of 100 s before a connection interrupt. The setting of lower values does not conform to standard. The only remaining solution for mutual monitoring is an additional (redundant) confirmation mechanism at the application level with a corresponding overhead.

Due to the directed transmission, the complexity of connections in the system is enormous. Every computer is to be coupled to every other one. In the case of the redundant LAN bus, connections are to be operated over both buses. For example: an average supervisory control system, including 8 computers and a redundant LAN bus, requires 2×7×8=112 full-duplex connections and 224 half-duplex connections.

The system structure is programmed or parameterized into the software (terminology: "send message to", "receive message from"). Implementation proves to be complex, especially error processing.

The structure dependence of the software gives rise to retroactive effects in the case of an error due to the necessary producer/consumer principle.

Standardized protocols do not allow automatic switching over to a redundant bus in the event of failure of the LAN bus.

Failures/reconfigurations in the system result in data loss in the protocol buffers. That requires the additional buffering of the transmission data on the application level.

Data consistency requires multiphase transmission concepts. Those are complex to implement (high demands on time and the messages) and require the transmission timing to be controlled. TCP reception confirmations cannot be evaluated for the implementation of 2-phase concepts and an additional confirmation mechanism on the application level is necessary.

With the conventional use of standardized protocols, the total and causal sequence of messages requires complex measures, for example message histories.

Thus, in conventional use, standardized communication protocols do not meet the requirements for supervisory control systems.

SUMMARY OF THE INVENTION

It is accordingly an object of the invention to provide a method of consistent message transmission, which overcomes the hereinafore-mentioned disadvantages of the heretofore-known methods of this general type and which meets the above-mentioned requirements, while at the same time allowing standardized communication protocols to be applied.

With the foregoing and other objects in view there is provided, in accordance with the invention, a method of message transmission according to the producer/consumer principle between users in a distributed system with token passing and with time monitoring for fault detection, which comprises assuring consistent message transmission, even in the case of a fault, by selecting between:

A) a first, ring-multicast (R-MC) method version in which a data token is passed in a ring and contains information for message (user data) transmission, controlling transmission authorization, sequentializing a message sequence and mutual user monitoring; and B) a second, datagram-multicast (D-MC) method version in which a check token is passed in the ring and messages (user data) are transmitted in physical multicast with datagrams, wherein:

B1) in the case of an access-controlled message transmission (D-MC/Z):

carrying out the message transmission only from the respective user in possession of the check token, and placing information in the check token for controlling the transmission authorization, for exchanging confirmation and sequence information as well as for mutual user monitoring, and B2) in the case of a spontaneous message transmission (D-MC/S):

carrying out the message transmission spontaneously, independently of the position of the check token after a competing access procedure, and placing information in the check token for exchanging confirmation and sequence information as well as for mutual user monitoring; and C) carrying out a special token procedure for all of the method versions (R-MC, D-MC) which is based on a coincidence of monitoring and information states of the users existing in the transmission procedure, with which a logical resumption being derived from a consecutive sequence number is carried out in the case of an error, without impairing data consistency.

The method according to the invention can be implemented in altogether three basic versions, namely a ring-multicast (R-MC) method, which is referred to as the first version, and a datagram-multicast (D-MC) method, which is referred to as the second version and which in turn, depending on the access method, can be implemented in two configurations (D-MC/Z, D-MC/S).

The versions of the method, which are merely referred to below as the methods for short, include partly different and partly the same features, as is specified above as well as being described below.

In the case of the ring-multicast (R-MC) method, a token is used for message transport, for controlling transmission access and for the mutual monitoring of the computers (data token).

In the case of the datagram-multicast method with access-controlled message transmission (D-MC/Z), a token is used for controlling transmission access, for exchanging confirmation and sequence information as well as for mutual monitoring (control token). The message transmission itself takes place when in possession of a token in physical broadcast or multicast with datagrams.

In the case of the datagram-multicast method with spontaneous message transmission (D-MC/S), a token is used for exchanging confirmation and sequence information as well as for mutual monitoring (check token). The message transmission takes place spontaneously, irrespective of the position of the token, in physical broadcast or multicast with datagrams.

The D-MC/Z and D-MC/S methods are also referred to below as datagram methods or datagram-oriented methods. Confirmation, sequence and status information are referred to together below by the term check information.

The ring-multicast (R-MC) method is a logical multicast concept. The datagram-oriented methods (D-MC) can be implemented both in physical multicast and in broadcast. No distinction is any longer made below between multicast and broadcast, but instead the more general term multicast is used.

The method versions are similar in their basic structure and are equivalent to the extent that each of the methods meets all of the requirements for message transport without any restriction. In addition, each of the methods has characteristic properties in comparison with the others. These features come to fruition in the implementation of a method, i.e. under actual boundary conditions, and they are explained in the following method description. The methods according to the invention are not tied to any standard. An advantageous realization is possible on the basis of standardized LAN bus systems and communication protocols. Already existing subfunctions may be used, for example CRC check sums of standardized protocols or collision detection with automatic repetition if using an Ethernet LAN (IEEE802.3). Standardized protocols are used in a problem-specific way.

That allows the requirements for supervisory control systems to be met and the basic advantages of standardized protocols to be utilized, while avoiding the problematical aspects explained. Implementation on the basis of standardized protocols is explained below with reference to an exemplary embodiment.

The ring-multicast (R-MC) method is a pure ring concept. The token serves for message transmission, controlling the bus access, sequentializing the message sequence and mutual monitoring. The token length is adapted dynamically to the current occurrence of messages. The transmission of the token can take place unconfirmed, since each user can keep a check on the passing around of the token by monitoring the next token reception (implicit confirmation mechanism in the ring). The ring-multicast method is tailor-made for small and medium supervisory control systems.

In accordance with another mode of the invention, the messages can also be transmitted block by block in the token.

In the case of the datagram-oriented methods (D-MC), messages are transmitted in the physical multicast. In accordance with a further mode of the invention, the messages are combined in blocks and transmitted as datagrams. The datagram transmission itself takes place unconfirmed. The token serves for transmitting control information, i.e. confirmations and sequence information on the message blocks being transmitted, as well as for mutual monitoring. A confirmed transmission of the message blocks is implemented through the use of the check token. A mechanism with negative confirmation is used. Transmitted message blocks are marked by the sender in the token as transmitted. The other users check the reception of the message blocks and, if not received, enter a negative confirmation in the token. In this case, the sender must repeat the transmission.

In the case of the access-controlled method (D-MC/Z), the transmission authorization is also passed on in the token. In the case of the method with spontaneous transmission (D-MC/S), all of the stations are authorized to send at all times, irrespective of the current position of the check token.

The datagram methods are constructed for large supervisory control systems with a considerable occurrence of data. Transmission in physical multicast results in a reduction in the transmission and bus load in comparison with the ring-multicast concept (R-MC). The token includes only check information, i.e. the length and the passing-round time are reduced. Furthermore, the communication load is very asymmetrical in the systems being considered herein. All of the process data are passed through the master computer and are transferred from the latter to the other computers. The datagram-oriented methods are adapted to these loading situations. Only users having transmission data carry out a multicast transmission. In the case of a very considerable occurrence of data, several datagram transmissions during one token passing-around sequence are possible in the case of the method with spontaneous transmission (D-MC/S).

All three alternatives ensure data consistency in the event of errors in the distributed system. That property relies on the coincidence of the token position with the state of transmission of messages in the system. In the case of the ring-multicast method, the state of transmission of messages is directly reflected by the token. In the case of the datagram-oriented methods, the state of transmission is reproduced by the check information of transmitted (blocks of) messages kept in the token: transmitted blocks of messages are entered with their identification in the token by the transmitter upon obtaining the token and are not released through the use of this identification by the receiver until the token is obtained, i.e. even in the case of this method the token reflects the current state of transmission.

Entered in the token is a consecutive sequence number, that incremented by each sender. The token serves for error detection and locating. On the basis of the coincidence of the token position and the state of transmission, in the event of an error the current state of transmission of the individual users can also be exactly reconstructed by determining the last-applicable token position. That permits a smooth continuation of the transmission while preserving guidance consistency. The atomicity principle is fundamentally satisfied on account of the transmission of user data and check data in a ring form, i.e. transmission to only one receiver in each case. Due to the serializing effect of the token with respect to transmitted messages (R-MC) and the check information of transmitted blocks of messages (D-MC), the message transmission takes place with FIFO sequence, total and causal sequence.

Defective users are automatically excluded. The message transport takes place on the application level without any retroactive effects even in the case of an error. In accordance with an added mode of the invention, there may be provided automatic bus switching in the event of faults in the communication system, while preserving data consistency. Advantageous developments of the error tolerance measures are explained with reference to an exemplary embodiment.

Through the use of a token protocol, the methods have a stable and predictable runtime performance. That also applies to the D-MC/S method, which is affected by collisions. The number of transmitting operations per token passing-around sequence is limited in the case of this method, for example to 20% of the maximum loading if the method is executed on the basis of an Ethernet LAN. As a result, appreciable delays caused by collisions are avoided.

The methods according to the invention permit a confirmed multicast transmission. That, and the use of a combined method for mutual monitoring and for exchanging messages, confirmations and sequence information as well as the block-by-block transmission of messages, results in a clear reduction in the LAN and computer loading, the protocol complexity and the high implementation demands in comparison with existing concepts.

The three methods according to the invention are explained in more detail below with reference to exemplary embodiments.

EXEMPLARY EMBODIMENTS OF THE METHODS

The exemplary embodiments were implemented as communication systems in a distributed computer system. The systems are based on the standardized UDP/IP protocol. UDP/IP operates without connections, and it permits unconfirmed transmission of datagrams in unicast, multicast and broadcast. An Ethernet LAN (IEEE802.3) is used as the bus system. The standardized hardware and software being used as a basis includes automatic safeguards against data falsification (CRC check sum) as well as for handling collisions. When collisions are detected, automatic frame repetition takes place. For these reasons, collisions or errors caused by falsified data are not considered further below.

Depending on the occurrence of data, the information units being exchanged have different lengths (in the range from 10 bytes to 30 kbytes). Large information units are fragmented by the underlying network and protocol layers, i.e. are divided up into smaller units to be transmitted. Each fragment is supplemented with protocol-specific information. In order to create a uniform transmission mechanism, independent of the length of the information units and of the underlaid protocol and network layers, and for handling the loss of individual fragments of relatively large information units, a block-oriented transmission mechanism was implemented in an advantageous development. The items of information being exchanged are transmitted as contiguous blocks and the block transmission operates atomically. In the event of errored transmission or loss of block fragments, an information block is completely rejected.

Other features which are considered as characteristic for the invention are set forth in the appended claims.

Although the invention is illustrated and described herein as embodied in a method of consistent message transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The following description deals separately with the ring-multicast method and the datagram methods. The latter are structured similarly and are explained together, but differences are pointed out as and when applicable.

BRIEF DESCRIPTION OF THE DRAWINGS

FIG. 3 is a block circuit diagram of a data token structure in the case of the ring-multicast (R-MC) method;

DESCRIPTION OF THE PREFERRED EMBODIMENTS

Figure 1:
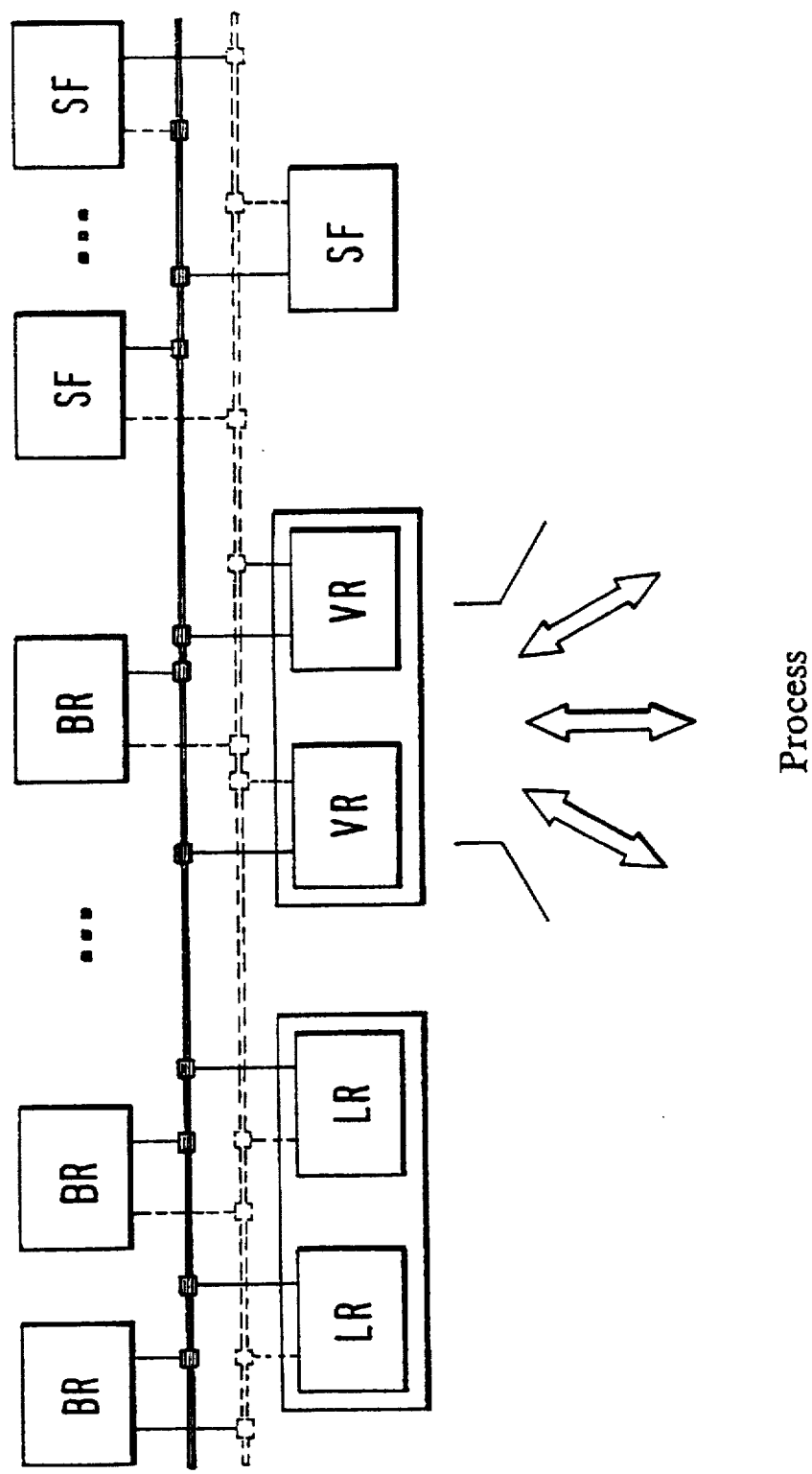
FIG. 1 is a block circuit diagram of a structure of a supervisory control system as is known in the prior art.

Referring now to the figures of the drawing in detail and first, particularly, to FIG. 1 thereof, there is seen a typical structure of a supervisory control system, with reference to which the requirements for such a supervisory control system or for a transmission method used therein are explained below.

FIG. 1 diagrammatically shows the structure of a supervisory control system, including a plurality of computer components, such as auxiliary computers VR for process coupling, master computers LR for handling basic supervisory functions, which are known as SCADA functions, operator console computers BR for process visualization and additional computers for handling optional secondary functions SF. The computers are coupled through a local area network (LAN), typically an Ethernet. In order to increase the availability of the overall system, computers performing an important function (in the diagram: VR and LR) as well as the LAN bus are of a redundant configuration. The computers operate on a continuously updated process map that is managed locally in each case (decentralized database organization). Transaction data are sent as messages. Due to the distribution and redundancy of functions and databases, there are complex data flows in the distributed system.

The explanation of the exemplary embodiments in each case is broken down into a description of the time sequence, explanations of the protocol characteristics and a description of the information units being exchanged. The basic description is that for a distributed system, including three users or subscribers (T1–T3). The time sequence is represented in several phases (A–F).

1. Ring-multicast (R-MC)

1.1 Description

Figure 2C:
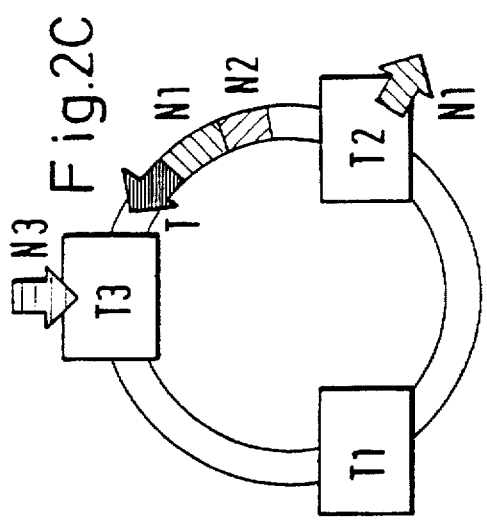
FIGS. 2A to 2F are diagrams showing a transmission sequence in the case of the ring-multicast (R-MC) method according to the invention of the instant application; p
Figure 2F:
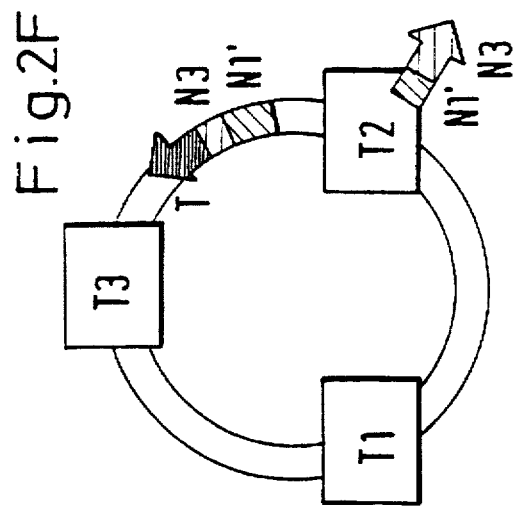
Figure 2B:
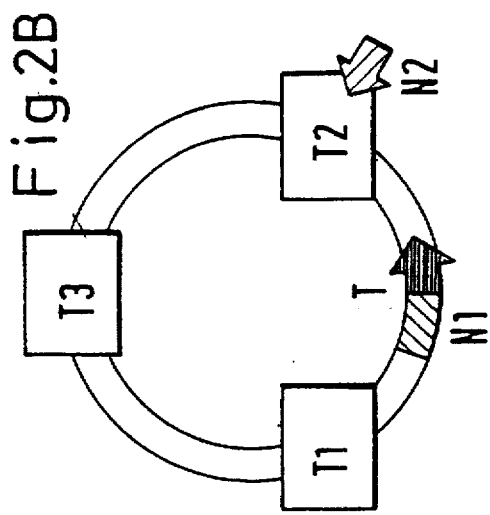
Figure 2E:
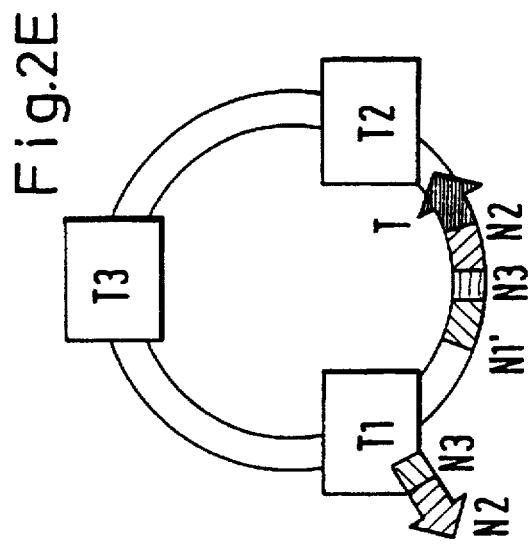
Figure 2A:
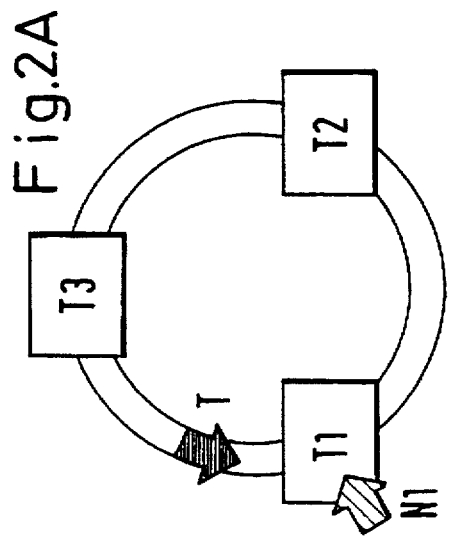
Figure 2D:
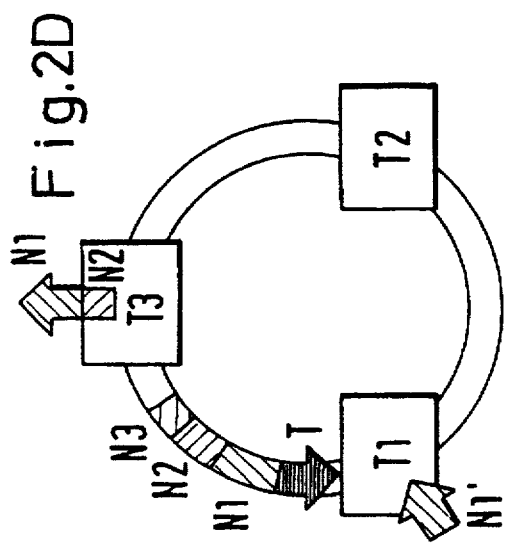

FIGS. 2A to 2F show the time sequence of the transmission without any errors for the ring-multicast (R-MC) method. Assumed as the initial situation is the circulation of an empty data token T (FIG. 2A). A user T1 has messages N1 to be transmitted. Upon obtaining the token, he or she enters them in the token and passes the token T on to the successor T2 (FIG. 2B). The successor T2 has messages N2 ready for transmission. Upon obtaining the token T, he or she copies its content into a local reception buffer, adds his or her own transmission data N2 onto the end of the token and passes the token on (FIG. 2C). After passing on of the token, messages are selected for application from the local copy of the token (in the example the messages N1 of the user T1). In the case of the user T3, the procedure is analogous to T2 (FIG. 2D). After the token T has been passed right round, the user T1 erases his or her own messages T1 from the token, copies the token content into the local reception buffer, adds new data N1' onto the end of the token, passes the token on to the user T2 and selects messages of other users (FIG. 2E). The user T2 handles the token T analogously to the user T1. In the example he or she has no further messages to send (FIG. 2F).

When in possession of the token, each user can enter messages of any number and length in the token (variable token length).

1.2 Common characteristics of the methods (all three concepts)

A number of common characteristics of the methods can be explained with reference to the ring-multicast concept. They also apply to the datagram concepts explained below:

The setting up of a ring can be initiated by any user.

Stations must initially be integrated into the ring to be able to participate in the exchange of messages. For this purpose, registration of the station to be newly included is necessary with the predecessor.

The transmission of all information units takes place in a block-oriented manner.

The token is sent to all of the users with the same frequency, i.e. there is no higher prioritizing for certain users.

Information for analysis of the states of the successor and LAN bus is transmitted asynchronously with respect to the token.

Information on the new inclusion of a user is transmitted asynchronously with respect to the token.

Each station monitors its successor and defective stations are excluded by the predecessor. The reconfiguration takes place without adversely affecting data consistency.

In the event of bus failure, automatic switching over to the redundant bus takes place. The reconfiguration takes place without adversely affecting data consistency.

1.3 Protocol characteristics: R-MC

Compare "Common characteristics of the methods".

User data are passed in the form of a ring in the system (directed transmission of the data token).

The data token is of variable length.

Upon obtaining the token, each user may enter his or her own messages in the token.

There is no selective station in the system. During the reconfiguration phase, the station with the last-applicable data token temporarily becomes the ring master.

Collision-free data traffic in normal operation.

Reception data are selected and released after passing on of the token.

1.4 Information units exchanged

In addition to the data token which was already explained, use is also made of further information units, which are required for error handling and for incorporating new users, as explained in more detail further below. The information units are listed below.

Data token

Contains the messages to be transmitted, ordered according to the individual users in the ring.

Link check request

Request by a ring user to its successor for user and bus monitoring.

Link check acknowledge

Response of a ring user to a link check request.

Init token

Contains the system status information and the sequence number of the sender. The sender notifies its successor of the local system status information and at the same time applies to be the ring master.

Configuration token

Contains the system status information and the sequence number of the ring master. The ring master notifies the other ring users of a changed ring configuration (after the new inclusion of a user or failures).

Enter request

A user wants to initialize the ring or be included as a ring user. Information is sent by the user wanting to be included to the desired predecessor.

Leave token

A user notifies the others that it would like to leave the ring.

All information items are transmitted unconfirmed. Token information is sent past all of the users in the ring. The other information units are exchanged in each case between two users and the transmission takes place asynchronously with respect to the token.

1.5 Block structure

FIG. 3 shows, by way of example, the structure of the data token for the ring-multicast (R-MC) method. Corresponding to the header, the method according to the invention with details stating the token length, the block sequence number of the token and the block type (in this case: data token) is followed by the data areas of the individual ring users, in each case having a variable length. Each data area includes a user-related header with the statement of the user and the data area length and, thereafter, the messages of this user. The messages in turn include a header and the data itself.

The message header is made up of a selector for the assignment of messages and the statement of the message length.

The user designations K, K+1, etc. to K−1, which are entered in FIG. 3 in the data areas, are to be understood as meaning that K may be any user, for example the user T2 (see FIGS. 2A–2F), the user K+1 then being the user T3, and user the K−1 being the user T1. Thus, in this example, the data of the user T1 are in the last place in the data token.

Not drawn in are information items added by underlaid protocol and network layers (sometimes multiply in the case of fragmentation): Ethernet, IP and UDP headers.

All of the information units are exchanged in a block-oriented manner between the protocol layers.

Init and configuration tokens contain the system status information in the data part. In the case of the asynchronous information units, the identification of the sender is in the data area, or the data area is empty, i.e. only the block header is transmitted.

2. Datagram multicast (D-MC/Z and D-MC/S)

In the case of the datagram-oriented methods (D-MC), the data transmission takes place in physical multicast with the datagram services of the UDP/IP protocol. Modern operating systems permit not only the transmission in physical multicast but also the selection of received frames by hardware mechanisms.

Datagram transmission takes place in a block-oriented and unconfirmed manner. In order to implement an error-protected transmission, the definition of uniform reception sequence and for mutual monitoring, a check ring is set up between the individual communication users. In the case of the datagram-multicast method with access-controlled transmission (D-MC/Z), the multicast transmission of user data takes place only when in possession of the check token. In the case of the method with spontaneous transmission (D-MC/S), user data transmission and exchange of the check token take place asynchronously, i.e. the transmission of a message block is possible at any time.

A message block may contain messages of any number and length.

2.1 Description of the methods

Figure 4C:
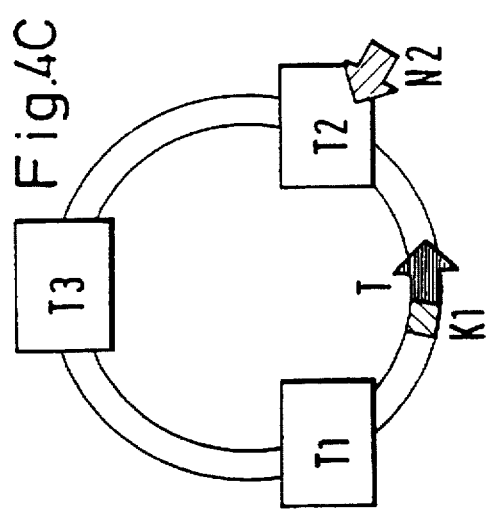
FIGS. 4A to 4F are diagrams showing a transmission sequence in the case of the datagram-oriented method with access-controlled transmission (D-MC/Z)
Figure 4F:
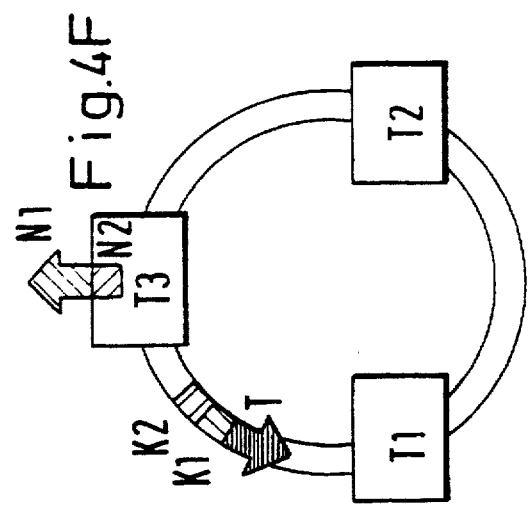
Figure 4B:
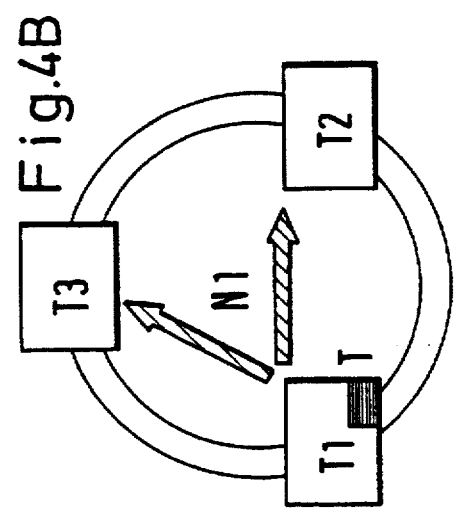
Figure 4E:
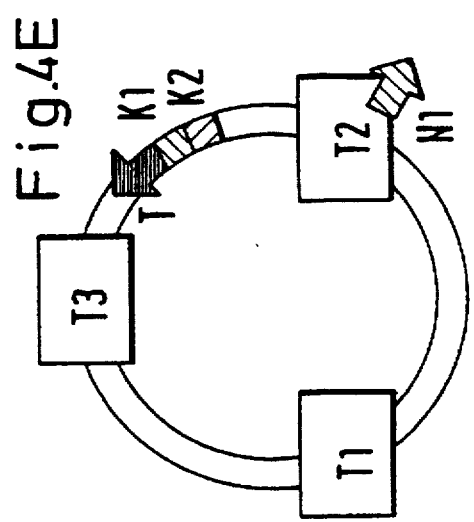
Figure 4A:
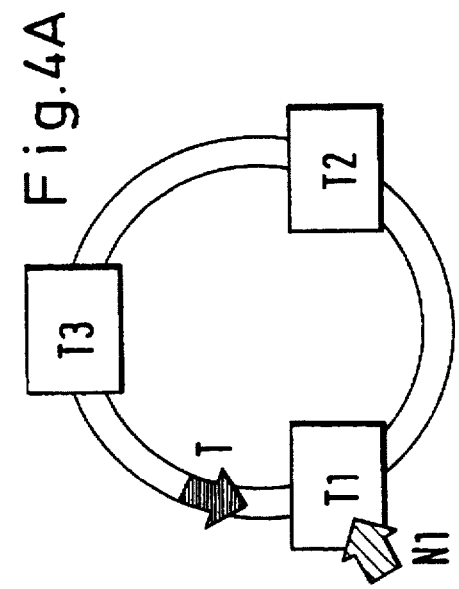
Figure 4D:
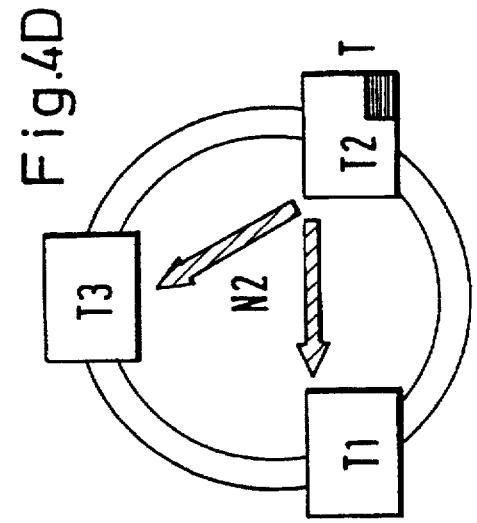

The time sequence of the transmission for the datagram-oriented method with access-controlled transmission (D-MC/Z) is represented in FIGS. 4A to 4F. The circulation of an empty check token T is assumed as the initial situation. The user T1 has messages N1 to be transmitted (FIG. 4A). Upon obtaining the token, it carries out the datagram transmission in multicast and enters the check information K1 of the transmitted message block in a check field in the token (FIG. 4B). The check field includes the identification of the sender, a transmitter-related sequence number as well as a global sequence number, which is assigned to the message blocks. The token has a global sequence number with it for this purpose. This is incremented by the respective token owner for each transmitted message block, is assigned to the transmitter-related sequence number and is entered together with the latter in the check field. Through the use of the assignment of the global sequence number, all of the message blocks are provided with a unique and consecutive identification. This identification allows a uniform reception sequence of transmitted message blocks.

Subsequently, the token is passed on to the successor T2 (FIG. 4C). The receiver stations initially leave received message blocks in the reception buffers without releasing them for application. The successor T2 likewise has messages N2 ready for transmission. Upon obtaining the token, it transmits them in multicast (FIG. 4D) and enters the identification K2 of the message block N2 in the check field in the token. Subsequently, it checks whether or not there the reception buffer contains message blocks (K1) marked as transmitted in the check token. If this is the case, received message blocks (N1) are ordered according to the global sequence number and are released for processing (FIG. 4E). If a message block marked as transmitted in the check token has not been received, a negative confirmation is entered in the check field of the message block and the sender must carry out the transmission again. In addition, the owner of the check token checks whether or not its own transmission data of the last token cycle has been received by all of the users. If so, the data block is erased in the transmission buffer and so too is the entry in the check token. If not (negative confirmation in the check field), the transmission is carried out once again with the old sequence number. The global sequence number is likewise retained. This is necessary in order to detect duplicates on the reception side and to release subsequently supplied message blocks with the correct sequence for application.

The processing sequence for the subscriber T3 and during further passing-round sequences takes place analogously to the above description (FIG. 4F).

The assignment of a global sequence number to message blocks and its allocation through the token guarantees the total sequence of the message blocks and of the messages contained therein. The causal sequence of blocks and messages likewise arises from the transmission in ring form of the check information (sequentializing effect).

Figure 5C:
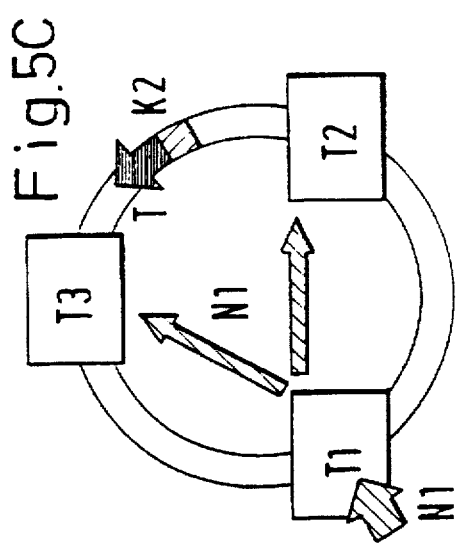
FIGS. 5A to 5F are diagrams showing a transmission sequence in the case of the datagram-oriented method with spontaneous transmission (D-MC/S)
Figure 5B:
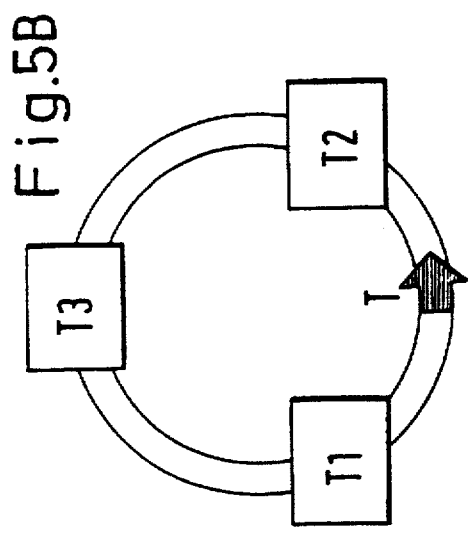
Figure 5A:
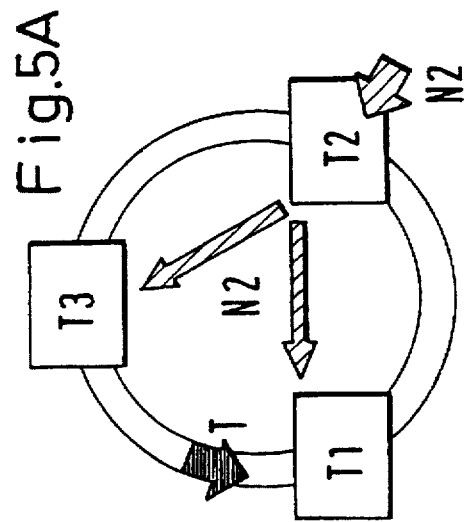
Figure 5F:
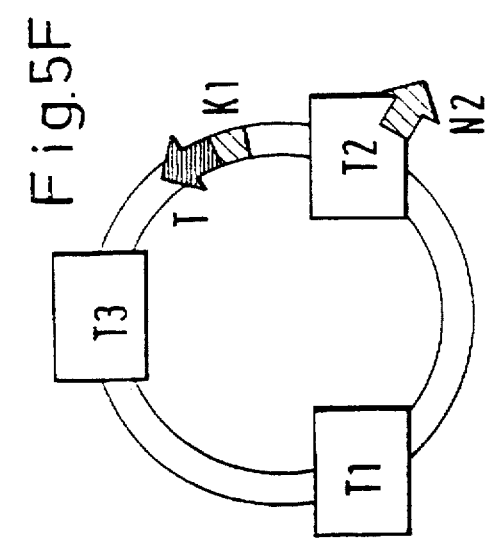
Figure 5E:
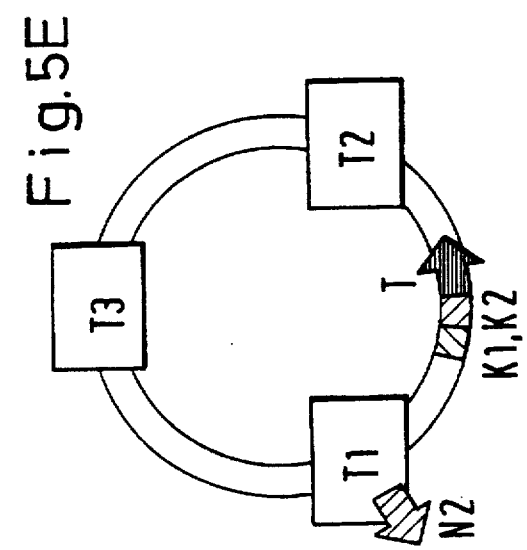

FIGS. 5A to 5F show the time sequence of the transmission in the case of the method with spontaneous transmission (D-MC/S). Users wishing to send, namely the user T2 in FIGS. 5A to 5F, send their messages N2 spontaneously in multicast, asynchronously with respect to the circulating check token (FIGS. 5A, 5B). Upon obtaining the check token, the user T2 enters the check information K2 of the transmitted message block N2 in a check field in the token (FIG. 5C). The structure and the handling sequence of received message blocks and of the check token is identical to the method with access-controlled transmission (D-MC/Z). Once the token has been handled, it is passed on to the successor T3. Further asynchronous transmissions of message blocks by any users are possible at any time (FIG. 5C).

Figure 5D:
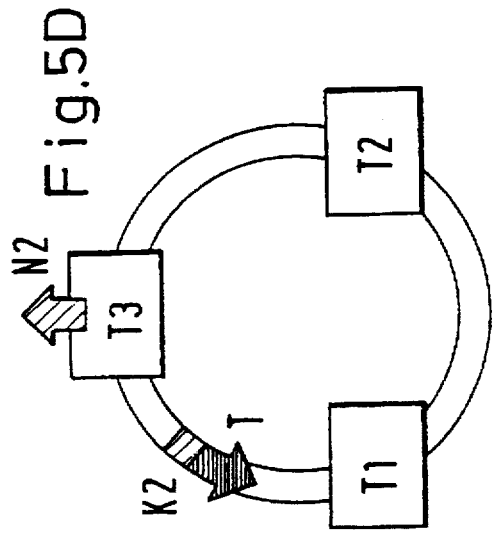

The release of received message blocks takes place as in the case of the access-controlled method when in possession of the token (FIGS. 5D, E, F). The mechanisms for controlling the message sequence are likewise identical to those of the access-controlled method.

2.2 Protocol characteristics: D-MC/Z

Compare "Common characteristics of the methods".

Check information is passed in the form of a ring in the system (directed transmission of the check token).

The check token is of variable length.

The transmission authorization is controlled through the use of the token. Upon obtaining the token, each subscriber may send its own message blocks as datagrams and enter them in the token.

There is no selected station in the system. During the reconfiguration phase, the station with the last-applicable check token temporarily becomes the ring master.

Collision-free data traffic in normal operation.

Data blocks received during the last token passing-round sequence are sorted upon obtaining the token and are released to the application.

Data is transmitted in broadcast or multicast.

Confirmations, sequence information, system status information and bus access authorization are carried in the token.

Reception confirmation takes place block by block. This is possible since it is ensured by the mechanisms of the block transmission that information units of any desired length are only transmitted in full (in the event of loss of individual fragments, complete blocks are rejected).

2.3 Protocol characteristics: D-MC/S

Compare "Common characteristics of the methods".

Check information is passed in the form of a ring in the system (directed transmission of the token).

The check token is of variable length.

All of the stations are entitled to transmit user data (datagrams) at any time. Upon obtaining the token, message blocks sent in the last token cycle are entered in the token.

There is no selected station in the system. During the reconfiguration phase, the station with the last-applicable check token temporarily becomes the ring master.

Data blocks received during the last token passing-round sequence are sorted upon obtaining the token and released to the application.

Data is transmitted in broadcast or multicast.

Confirmations, sequence information and system status information are carried in the token.

During a token passing-round sequence, several transmissions of data blocks are possible.

The reception confirmation takes place block by block. This is possible since it is ensured by the mechanisms of the block transmission that information units of any desired length are transmitted only in full (in the event of loss of individual fragments, complete blocks are rejected).

2.4 Information items exchanged (D-MC/Z and D-MC/S)

In addition to the message block that was already explained (datagram) and the check token, use is also made of further information units, which are required for error handling and for incorporating new users, as is explained in more detail further below. The information units are listed below. The information exchanged is identical for both datagram methods.

Message block

Contains the messages to be transmitted of a ring user.

Check token

Contains the check information items (confirmation, sequence and status information), ordered according to the individual users in the ring.

Link check request

Request by a ring user to its successor for user and bus monitoring.

Link check acknowledge

Response of a ring user to a link check request.

Init token

Contains the system status information and the sequence number of the sender. The sender notifies its successor of the local system status information and at the same time applies to be the ring master.

Configuration token

Contains the system status information and the sequence number of the ring master. The ring master notifies the other ring users of a changed ring configuration (after the new inclusion of a user or failures).

Enter request

A user wants to initialize a ring or be included as a ring user. Information is sent by the user wanting to be included to the desired predecessor.

Leave token

A user notifies the others that it would like to leave the ring.

2.5 Block structure

Figure 6:
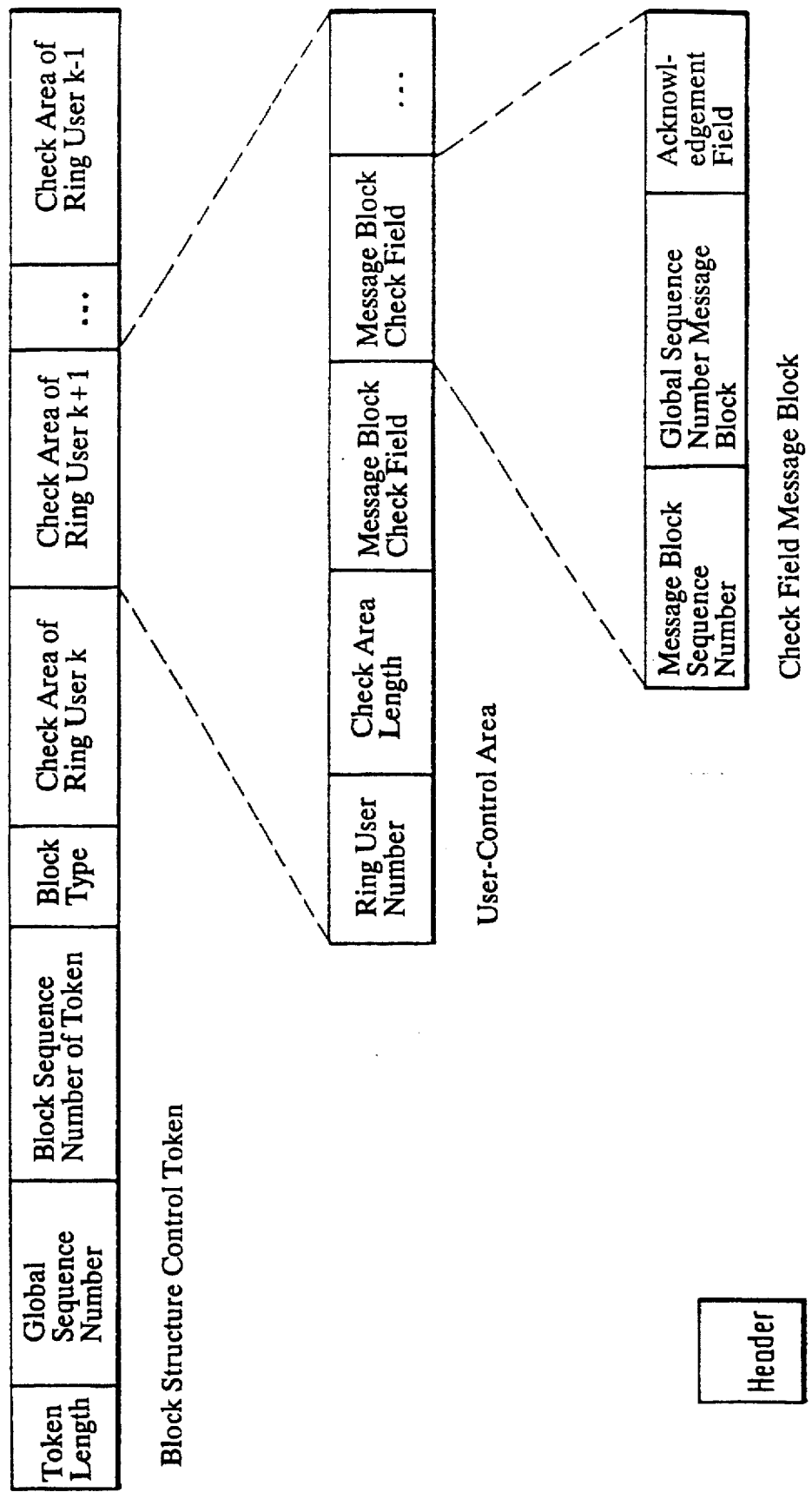
FIG. 6 is a block diagram showing a check token structure in the case of the datagram-oriented method D-MC.

By way of example, FIG. 6 shows the structure of the check token for the datagram-oriented methods (D-MC). Corresponding to the header, the method according to the invention with details stating the token length, the global sequence number, the block sequence number of the token and the block type (in this case: check token) is followed by the check areas of the individual ring users, in each case having a variable length. Each check area includes a user-related header with the statement of the user and of the check area length and, thereafter, the check fields for the sent data blocks of this user. Each transmitted message block is assigned a check field in the check token. A check field includes the statement of the sender, the user-specific sequence number and the global sequence number of the message block.

Figure 7:
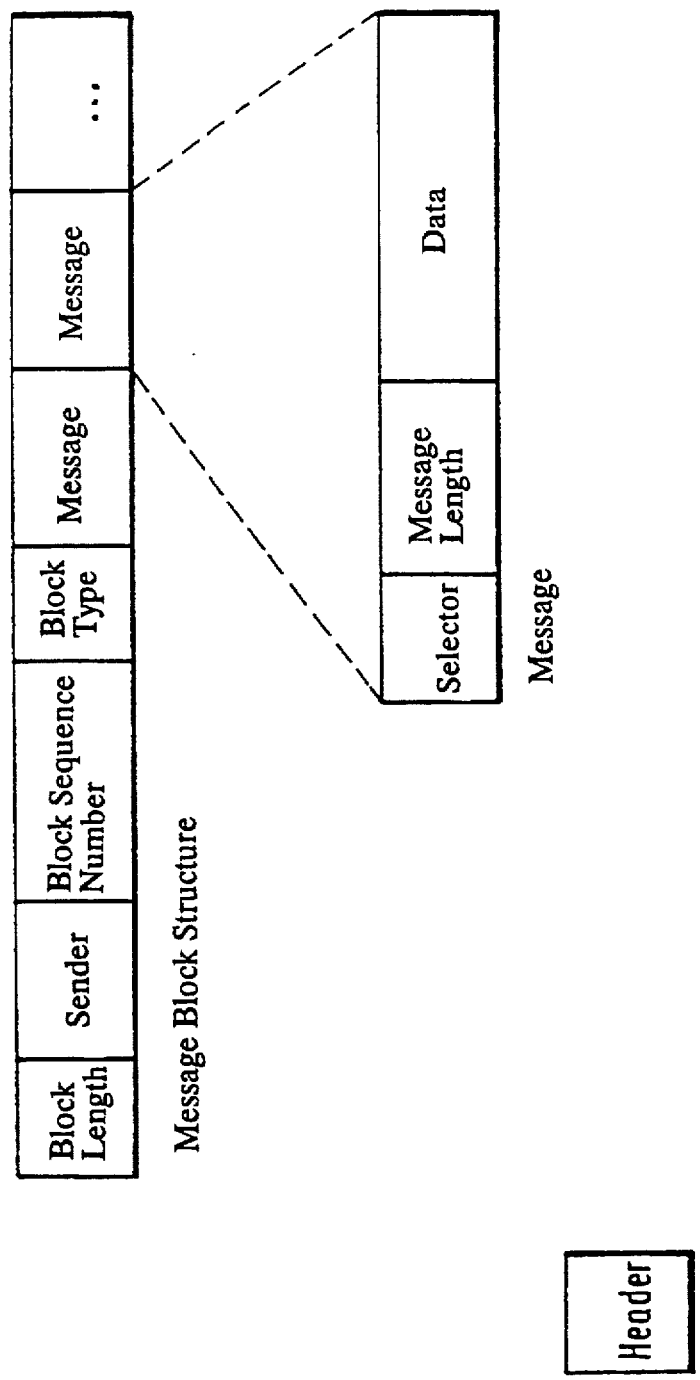
FIG. 7 is a diagram showing a message block structure in the case of the datagram-oriented method D-MC.

An example of the structure of a message block according to the datagram-oriented method (D-MC) is represented in FIG. 7. The block header with the statement of the block length, the identification of the sender, the block sequence number and the block type (in this case: message block) is followed by the messages of the sender. These in turn include a header and the data itself. The message header is made up of a selector for the assignment of messages and the statement of the message length.

Not drawn in are information items added by underlaid protocol and network layers (in the event of fragmentation, sometimes multiply): Ethernet, IP and UDP headers.

All of the information units are exchanged in a block-oriented manner between the protocol layers.

Init and configuration tokens contain the system status information in the data part. The other asynchronous information units are structured in a way corresponding to the message block. Depending on the type of the information unit, the identification of the sender is in the data area or the data area is empty, i.e. only the block header is transmitted.

3. Handling of errors/failures

Figure 9:
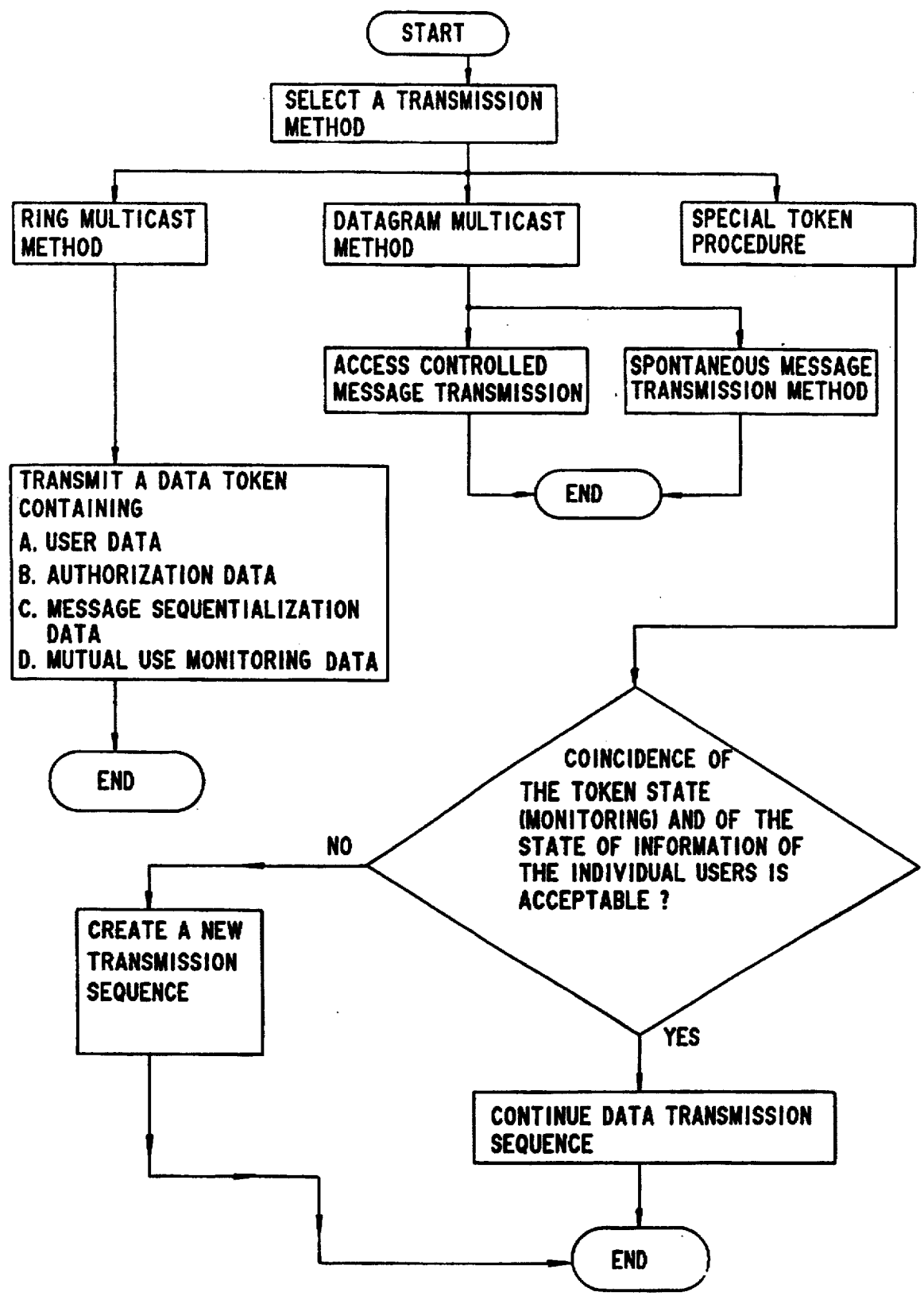
FIG. 9 is a flow chart depicting the selection process between the transmission methods and procedures.

The error tolerance mechanisms for the detection, localizing and handling of errors/failures in the system are of fundamental significance with respect to ensuring data consistency and system operation without any interruptions. The key characteristic of the methods described is the coincidence of the token state (monitoring) and of the state of information of the individual users. This permits exact reconstruction of the state of information in the case of an error and ensures data consistency. FIG. 9 shows a flow chart depicting the transmission selection options between a ring-multicast method, a datagram method and a special token procedure. The special token procedure is set up to determine whether the Users (i.e. T1, T2 and T3) are functioning properly. If any of the Users are not functioning properly, a new transmission sequence is set up to continue data transmission to the properly functioning Users.

The measures for the detection, localizing and handling of errors (error processing) are explained below with reference to an exemplary embodiment. They are identical for all three methods according to the invention.

The following requirements exist for error processing:

Errors/failures are to be detected and localized.

Failed computers are to be excluded. In the event of bus failure, the transmission is to be continued on the redundant bus.

The changed system status information is to be transmitted consistently to all of the (intact) users.

The data traffic is to be continued by the user with the last-applicable data or check token.

The error processing must take place quickly and in such a way as to preserve data consistency.

Due to the unconfirmed transmission of information, all errors or failures in the system result in a loss of the token. A loss is detected by timeout (token timeout). The error processing in the case of a detected token loss breaks down into a number of phases:

link check phase, init token phase, configuration token phase.

Figure 8F:
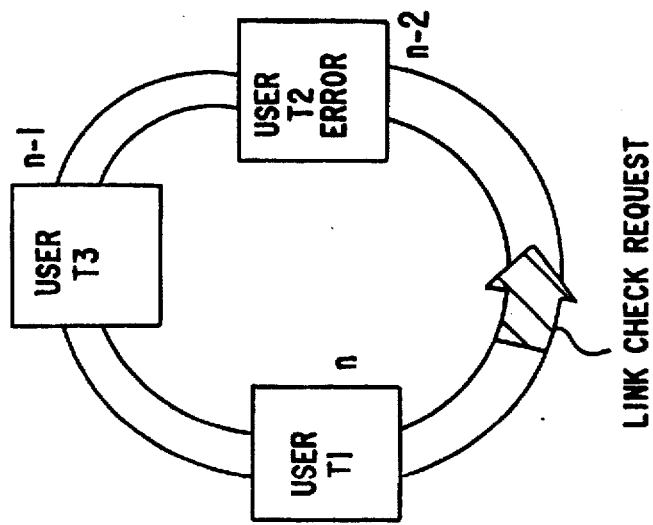
FIGS. 8a–8o are diagrams showing a transmission sequence in the case of detected transmission errors.
Figure 8E:
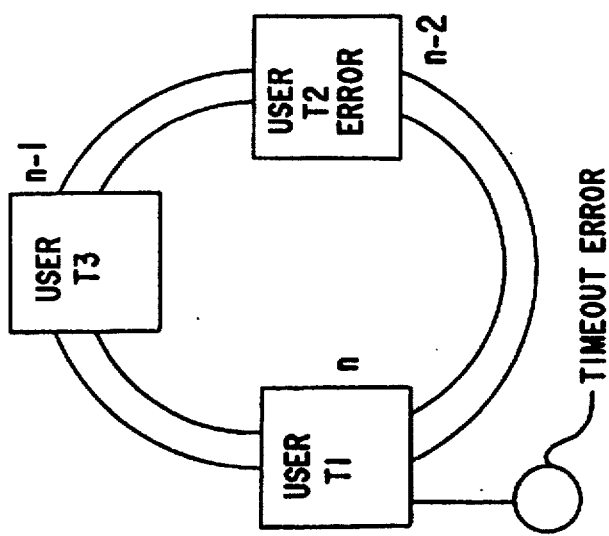
Figure 8D:
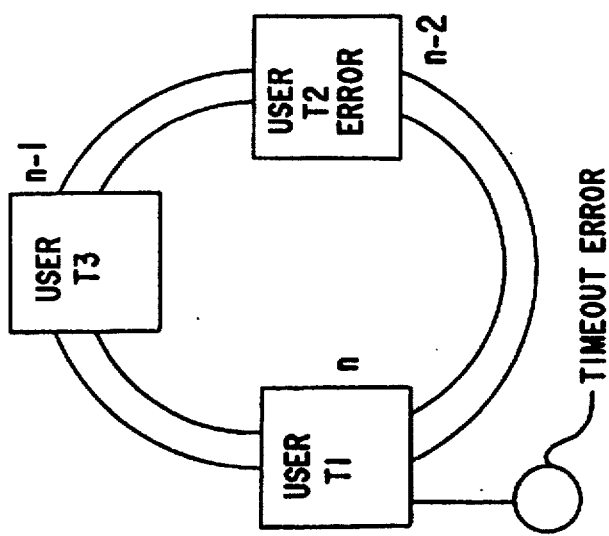
Figure 8O:
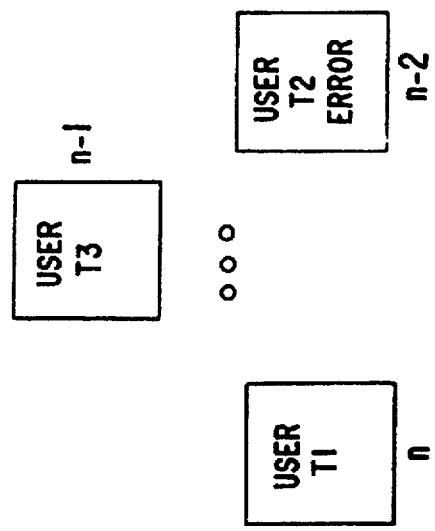

Users which have detected an error (token timeout; see FIG. 8a; T3) check the status of the successor (see FIG. 8a; T1) or of the LAN bus by transmitting a link check request to the successor. This is answered by intact successors through a link check acknowledge (see FIG. 8b; T1 to T3). In the case of a successful link check, an init token (see FIG. 8c; T3 to T1) is sent to the successor (see FIG. 8c; T1), which asks the latter to check its successor (see FIG. 8c; T2). In the case of an unsuccessful link check (after repeated attempts; see FIGS. 8d and 8e), the defective successor (see FIG. 8e; T2) is excluded (see FIG. 8e; T1-timeout error). The changed system status information is entered in the init token (see FIGS. 8f, 8g and 8h). The init token (see FIG. 8h) in this case is transmitted to the successor (see FIG. 8h; T3) of the excluded user (see FIG. 8h; T2). This applies in the case of single errors in the system. In cases of multiple errors, the init token is transmitted to the next intact user in the ring. The transmission of the init token is always preceded by the link check phase (see FIGS. 8f and 8g).

Figure 8N:
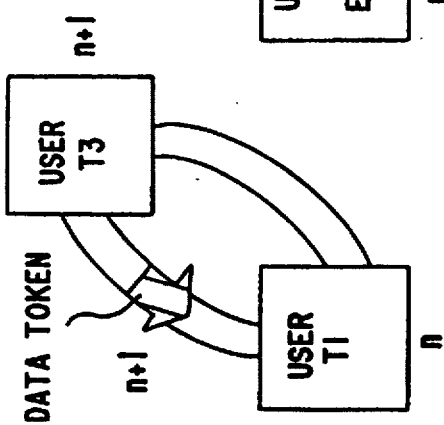
Figure 8M:
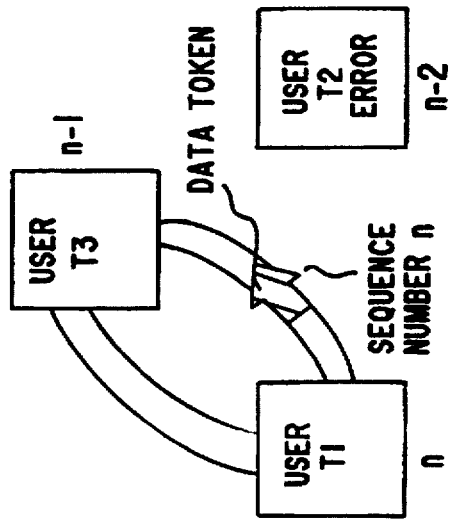

The init token phase serves at the same time for determining the ring user with the last-applicable data token or check token (ring master). The ring master is not a permanently fixed user, and in the case of an error it is determined temporarily, i.e. dependent on the current state of transmission. After error processing, the ring master continues the transmission of the data token (see FIG. 8i) or check token. In order to determine the ring master, the data token or check token is provided with a sequence number (see FIG. 8n), which is incremented by each user when the transmitting operation takes place. During error processing, each user enters in an init token, and when sending the token, the sequence number of the last-sent data token or check token, i.e. each user, "applies" to be a possible ring master. If an init token with a lower sequence number than the local sequence number of the last-sent data token or check token is received, the received init token is rejected. An init token with the receiver's own sequence number is passed on. If a received init token has a greater sequence number than the local sequence number, it is passed on (with a possibly altered configuration; see FIG. 8j). As a result of this algorithm, only the init token of the ring master remains. The ring master recognizes itself as such by the full passing-round sequence of its init token. The current system configuration (excluded users are removed from the list of active computers) is contained in the init token of the ring master after a full passing-round sequence. In the following phase, the ring master transmits this configuration by a configuration token to the other users (see FIGS. 8k and 8l). After the configuration token has successfully been passed round, the data exchange is continued by the ring master with its data token or check token (see FIG. 8n). Information of an excluded user is removed from the data token or check token by the respective predecessor. This ensures that messages are received by all intact users.

If further errors occur during error processing, this is detected by a token timeout. The error processing is restarted. The multiphase error processing with init token and configuration token also allows the toleration of multiple errors.

The method of determining the temporary ring master which is described above can be subdivided into the following features:

a) a user which has detected an error (token timeout) sends an init token with the sequence number of the last-sent data token or check token, b) a user which receives an init token sends an init taken with a sequence number which is formed by the maximum value of the sequence number of the last-sent data token and the sequence number of the init token being obtained, c) a user which has previously sent an init token and obtains an init token with a sequence number that is smaller than the sequence number of the last-sent init token rejects the init token being received, d) a user which has previously sent an init token and obtains an init token with a sequence number which is identical to the sequence number of the last-sent init token (data token or check token) recognizes itself as ring master, transmits the altered system configuration in the form of a ring to all of the users and subsequently continues the transmission with the last-applicable data token or check token.

We claim:

1. A method of message transmission according to the producer/consumer principle between users in a distributed system with token passing and with time monitoring for fault detection, which comprises assuring consistent message transmission, even in the case of a fault, by selecting between:

A) a first, ring-multicast (R-MC) method version in which a data token is passed in a ring and contains information for message (user data) transmission, controlling transmission authorization, sequentializing a message sequence and mutual user monitoring; and B) a second, datagram-multicast (D-MC) method version in which a check token is passed in the ring and messages (user data) are transmitted in physical multicast with datagrams, wherein:

B1) in the case of an access-controlled message transmission (D-MC/Z):

carrying out the message transmission only from the respective user in possession of the check token, and placing information in the check token for controlling the transmission authorization, for exchanging confirmation and sequence information as well as for mutual user monitoring, and B2) in the case of a spontaneous message transmission (D-MC/S):

carrying out the message transmission spontaneously, independently of the position of the check token after a competing access procedure, and placing information in the check token for exchanging confirmation and sequence information as well as for mutual user monitoring; and C) carrying out a special token procedure for all of the method versions (R-MC, D-MC) which is based on a coincidence of monitoring and information states of the users existing in the transmission procedure, with which a new transmission sequence being determined from a consecutive sequence number is carried out in the case of an error, without impairing data consistency.

2. The method according to claim 1, which comprises using LAN-based standardized communication protocols.

3. The method according to claim 1, which comprises using LAN-based standardized communication protocols from the group consisting of TCP/IP, UDP/IP and ISO/OSI.

4. The method according to claim 1, which comprises transmitting messages (user data) block by block.

5. The method according to claim 4, which comprises selecting the ring-multicast (R-MC) method and placing messages in the data token.

6. The method according to claim 4, which comprises using the datagram-multicast (D-MC/Z or D-MC/S) method, and placing in the check token a first head part with information according to a LAN-bus standard, a second head part according to a LAN-protocol standard, and a third head part with token information and identification information as well as confirmation information and sequence information of transmitted message blocks.

7. The method according to claim 6, which comprises placing in each message block (datagram) a first head part with information according to a LAN-bus standard, a second head part according to a LAN-protocol standard and a third head part with identification information and messages.

8. The method according to claim 1, which comprises placing a head part having a selector for message selection and stating a length, followed by user data, in the messages.

9. The method according to claim 1, which comprises automatically carrying out an exclusion of a defective user, in the event of faults or failures of users.

10. The method according to claim 1, which comprises using between a single-bus and a double-bus system for information transmission, and automatically switching over to a redundant bus system in the double-bus system in the case of a fault, without adversely affecting data consistency.

11. The method according to claim 1, which comprises transmitting additional asynchronous messages for the integration of further ring users, and checking the functional capability of users and for continuing network operation after a fault, apart from information transmission with token or datagrams.

12. The method according to claim 1, which comprises using a unique identification for said new transmission sequence in the case of a fault for each state of transmission, and forming the unique identification by each data protocol or token protocol being provided with a sequence number which is incremented by each user when the transmitting operation takes place.

13. The method according to claim 1, wherein all errors or failures in the system result in loss of the token, which is detected by a monitoring of the users as a token timeout, which comprises:

a) in the first step, checking the status of a successor with users which have detected an error and excluding defective users;

b) in the second step, determining a possibly altered system configuration as well as a temporary ring master, which is that user which sent the last-applicable data token or check token before the at least one error in the system occurred; and c) in the third step, transmitting the altered system status information in a passing-round sequence from the ring master with a configuration token to all of the intact users and, continuing the tra nsmission of the data token or check token once the passing-round sequence has successfully taken place.

14. The method according to claim 13, which comprises, in the second step, identifying the user which sent the last-applicable data token or check token before the at least one error in the system occurred, as the user with the highest sequence number in the system.

15. The method according to claim 13, wherein a user transmits a "link check request" message to the successor for checking of the status of the successor in step a), which comprises:

1) obtaining a "link check acknowledge" response message from the successor if the successor is intact, and then sending an "init token" request message from the user to the successor, requesting the successor to check its successor; and 2) excluding the successor after at least one attempt if the successor is defective, and transmitting the changed system status information in the "init token" message to the successor of the excluded user.

16. The method according to claim 15, which comprises determining the temporary ring master for the logical resumption in step b) by:

sending an init token with the sequence number of the last-sent data token or check token, from a user which has detected an error (token timeout);

sending an init token with a sequence number which is formed by the maximum value of the sequence number of the last-sent data token and the sequence number of the init token being obtained, from a user which obtains an init token;

rejecting the init token being received, by a user which has previously sent an init token and obtains an init token with a sequence number which is smaller than the sequence number of the last-sent init token; and recognizing a user which has previously sent an init token and obtains an init token with a sequence number which is identical to the sequence number of the last-sent init token (data token or check token) by itself as the ring master, transmitting the altered system configuration in the form of a ring to all of the users and subsequently continuing the transmission with the last-applicable data token or check token.

17. The method according to claim 13, which comprises carrying out step a) by checking the successor with alternate use of two bus systems in a system with a redundant bus, for establishing whether the error is in one of the bus systems or in the successor.

* * * * *

UNITED STATES PATENT AND TRADEMARK OFFICE
CERTIFICATE OF CORRECTION

PATENT NO. : 5,802,263
DATED : September 1, 1998
INVENTOR(S) : Ewald Dittmar et al.

It is certified that error appears in the above-identified patent and that said Letters Patent is hereby corrected as shown below:

Item [30] should be inserted as follows:

Sept. 9, 1994   [DE]   Germany ..... P44 32 075.2
May 19, 1995    [DE]   Germany ..... 195 18 357.6

Item [75] should read as follows:

Ewald Dittmar, Ludwigshafen; Hans Dieter Kochs, Duisburg; Werner Dieterle, Mülheim, all of Germany Signed and Sealed this Ninth Day of February, 1999

Attest:

*Acting Commissioner of Patents and Trademarks*

*Attesting Officer*